United States Patent [19]

Hoover

[11] Patent Number: 4,727,373

[45] Date of Patent: Feb. 23, 1988

[54] METHOD AND SYSTEM FOR ORBITING STEREO IMAGING RADAR

[75] Inventor: Milton B. Hoover, Phoenix, Ariz.

[73] Assignee: Loral Corporation, New York, N.Y.

[21] Appl. No.: 846,419

[22] Filed: Mar. 31, 1986

[51] Int. Cl.[4] ............................................. G01S 13/90
[52] U.S. Cl. .................................... 342/25; 342/180; 244/167
[58] Field of Search ...................... 244/167; 370/104; 455/12, 13; 73/382 R; 342/25, 180; 343/705; 364/516, 522; 367/88

[56] References Cited

U.S. PATENT DOCUMENTS

| | | | |
|---|---|---|---|
| 2,540,121 | 2/1951 | Jenks | 342/180 |
| 3,161,875 | 12/1964 | Preikschat | 342/140 |
| 3,241,142 | 3/1966 | Raabe | 342/355 |
| 3,328,797 | 6/1967 | Jorna et al. | 342/59 |
| 3,363,857 | 1/1968 | Vilbig | 343/705 |
| 3,375,353 | 3/1968 | Rossoff et al. | 364/516 |
| 3,611,371 | 10/1971 | Morse | 342/29 |
| 3,624,650 | 11/1971 | Paine | 342/191 X |
| 3,680,143 | 7/1972 | Ajioka et al. | 343/778 |
| 3,866,231 | 2/1975 | Kelly | 343/705 |
| 3,888,122 | 6/1975 | Black | 73/382 R |
| 3,978,444 | 8/1976 | Hitchcock | 367/88 |
| 4,083,520 | 4/1978 | Rupp et al. | 244/167 |
| 4,097,010 | 6/1978 | Colombo et al. | 244/167 X |
| 4,161,730 | 7/1979 | Anderson | 342/52 |
| 4,161,734 | 7/1979 | Anderson | 342/352 |
| 4,163,231 | 7/1979 | Zuerndorfer et al. | 342/25 |
| 4,321,601 | 3/1982 | Richman | 342/25 |
| 4,551,724 | 11/1985 | Goldstein et al. | 342/25 |

OTHER PUBLICATIONS

Kritikos et al., "MW Sensing from Orbit"; *IEEE Spectrum* (8/79, pp. 34–41).
Graham, "Flight Planning for Stereo Radar Mapping"; *Photogrammetric Engineering and Remote Sensing*, (vol. 41, No. 9; 9/75; pp. 1131-1138).
Graham, "Stereoscopic Synthetic Array Application in Earth Resource Monitoring"; *Naecon '75 Record* (pp. 125-132).
Carlson, "An Improved Single Flight Technique for Radar Stereo"; published paper on NRL Contract N00014-69-A-0141-0008 in 1972.
Graham, "Flight Planning for Stereo Radar Mapping"-(no date given).
Bair et al., "Performance comparison of Tech. 3 for Obtaining Stereo Radar Images", 1974.
Kaupp et al., "Simulation of Spaceborne Stereo Radar Imagery"; *IEEE Trans. on Geoscience and Remote Sensing*, (pp. 400–405; 7/83; vol. GE-21, No. 3).
Carlson et al., *Comparative Evaluation of an Improved Single Flight Stereo Radar Technique;* (N.T.I.S., 2/74; AD-774672).
Leberl et al., *Satellite Radiogrammetry: Phase I;* NASA, 3/31/82; Dibag-Bericht Nr. 4.

*Primary Examiner*—T. H. Tubbesing
*Assistant Examiner*—Bernarr Earl Gregory
*Attorney, Agent, or Firm*—P. E. Milliken

[57] ABSTRACT

This radar system makes it possible to collect complete stereo data in a single pass by utilizing an orbiting, side looking, bi-static, synthetic aperture radar. This system utilizes at least two orbiting spacecraft in synchronous parallel orbits with each other and separated by a tether. A transmitter transmits radar signals to a planet's surface which are reflected back and received by two receivers, one carried by each spacecraft. When the signals are combined, the layover produces a three dimensional picture in which vertical height information may be determined.

35 Claims, 6 Drawing Figures

METHOD AND SYSTEM FOR ORBITING STEREO IMAGING RADAR

BACKGROUND OF THE INVENTION

It has been long known in the photographic industry of the value in obtaining stereo aerial photographs. The stereo photographs provide a three dimensional image in which vertical height information is present. This is obtained by viewing two overlapping photographs. It has also been recognized that a stereo radar image can also be obtained by viewing two overlapping sets of radar images, however, this has been difficult to achieve. In stereo photography the pair of photographs have the same illumination angles and therefor the same shadows because the angle of the sun does not change appreciatively between photographs. In radar, the illumination of the object is achieved by a transmitted pulse of electromagnetic energy. Currently stereo radar systems require two separate passes past the image area to gather both sets of radar images. In the first pass a pulse is transmitted to the surface and received by a receiver. On a subsequent pass a second pulse is transmitted at a different elevation angle than the first and is received by the receiver at a different location from the first recording. By transmitting two different pulses, two different sets of shadows and/or backscatter will result, unlike photography, in which the differences in the shadows will prevent the images from converging and resulting in poor image quality. If steep radar illumination depression angles are used to avoid these shadows, the accuracy of the imagery is sacrificed due to range compression. In order to avoid this problem, various techniques have been used.

The techniques which have been used and/or studied to collect stereo radar imagery involve multiple passes past the imaged surface with different ground range offsets. These offsets may be due to the rotation of the planet from pass to pass. This results in the undesirable effects of the amount of overlapping coverage and the angular viewing difference being a strong variable depending on the eccentricity of the orbit, the location of the satellite in this orbit, and the circularity of the orbit. Thus the vertical scale will be variable and it will have to be recalculated for each new orbital condition. Another technique involves redirection of the antenna on a later orbit to change the viewing angle. Still another technique requires that the first pass transmits and receives the radar signal while a second pass collects the vertical height information with a radar altimeter. All of these techniques require processing data from more than one orbit to provide complete data for determining accurately the ground position of surface features. Most of the techniques are limited to certain orbits and can not give complete data for portions of these orbits.

The maximum angular difference between receivers is limited to the vertical angular beamwidth of the antenna. Larger angular differences, due to the planetary rotation between orbital passes eliminates all overlapping coverage, and therefore, the stereo imagery, while smaller displacement gives more overlapping coverage, but with progressively less angular difference. Thus, currently the stereo imagery obtained is limited to only those very small portions of the orbit which provide orbital pass to orbital pass displacements in the limited ranges of the angular coverage of the antenna. For any given planetary orbit orientation there are large portions of the planet's surface which cannot be stereo imaged. Re-aiming the antenna between orbital passes can increase the angular difference and give total overlapping coverage for portions of the orbit, but this requires complex and precise antenna pointing control while providing stereo imagery only for a limited range of latitudes. Complete coverage of even these latitudes requires many orbital passes.

Several techniques have been suggested for providing single flight stereo radar techniques involving aircraft, but not for spacecrafts. Furthermore, these techniques have many of the same disadvantages as discussed above. In these, a single aircraft is flown while transmitting two different radar beam pattern characteristics. This technique requires the use of two fan beam patterns to generate parallax on the images (see G. E. Carlson, "PERFORMANCE COMPARISON OF TECHNIQUES FOR OBTAINING STEREO RADAR IMAGES," IEEE TRANSACTIONS ON GEOSCIENCE ELECTRONICS, VGE-12, 114–122, (1974)).

A fairly thorough discussion of the above various methods is set forth in F. W. LEBERL, SATELLITE RADARGRAMMETRY—PHASE I, TECHNICAL UNIVERSITY AND GRAZ RESEARCH CENTER, 1982.

This invention provides for a single pass radar system utilizing steep viewing angles while eliminating most of the variables with fixed values independent of orbit. The vertical scale would be fixed and a function only of the range coverage and the altitude of the orbit. This system can produce full imaged swath width stereo imagery for any surface position from any given imaging orbit because the angular difference required is self-generated and is not dependent upon the planet's rotational motion. Such a radar system would be very useful for future earth resources surveys, continuous monitoring of earth resources and military all weather targeting missions.

SUMMMARY OF THE INVENTION

This invention makes it possible in one pass to collect complete stereo data from two different viewing angles simultaneously. A transmitter transmits signals to the planet which are reflected back and are received by two spaced apart receivers. Each receiver records a complete picture of the surface but from a different angle, much like the human eye. When the information is combined, the different layovers of these two pictures produce a three dimensional picture in which vertical height information may be determined. This may be accomplished through the use of satellites, the space shuttle, airplanes, etc.

The radar system is a bi-static radar system and provides for a number of spacecraft in synchronous parallel orbits with each other. In the preferred embodiment each also passes along a common flight path or ground track. The spacecrafts are separated by a constant distance from one another. In the preferred embodiment the spacecraft are in linear alignment with one another and with at least one spacecraft lower in altitude than another. The separation between spacecrafts may be maintained by a tether, which may be flexible, producing an orbiting gravity stabilized system. A transmitting means is carried by a spacecraft for transmitting a pulse of coherent radar signals to illuminate and reflect off of a planet's surface while two receiving means are each carried by a spacecraft for receiving data collected from different vertical angles relative to the imaged surface.

Transmission of the data from one spacecraft to another spacecraft could utilize the tether in either an external field (G-line) capacity or as an internal field (waveguide-fiber optic) capacity using repeaters as required. Alternately, the data could be transmitted through microwave antenna to antenna data links. Recovery of the information from this system could be made by either data linking to another satellite or to a remote ground station.

In the above configuration, there is no need to measure the altitude above the surface of the planet. The linear distance from the surface to be imaged can be determined by the length of time elapsed from sending and receiving the transmitted signals. Furthermore, the receiving angle difference and the separation is constant for a given circular orbit which allows for the selection of these parameters to optimize the performance.

A method of deploying this radar system involves orbiting at least one spacecraft carrying at least one other spacecraft in orbit about a planet. The carried spacecraft(s) is (are) either raised and/or lowered by utilizing a tether attached between them. The spacecraft carried by the first spacecraft may also carry a spacecraft which is either raised or lowered by a tether attached between them.

Accordingly, it is an object of this invention to provide an improved radar system by optimizing the relative viewing angles and hold them constant, while collecting all the data required to produce a stereo image of the entire illuminated swath of surface in a single pass.

Another object of this invention is to provide a method of providing stereo imaging of a planet's surface by deploying a coherent, bi-static radar in orbit about a planet.

Another object of this invention is to provide a stereo radar system having significant angular differences between the viewing angles.

Another object of this invention is to provide a gravity stabilized apparatus for providing stereo imaging of a surface area of a planet.

BRIEF DESCRIPTION OF THE DRAWINGS

The following is a brief description of the drawings in which like parts bear like reference numerals and in which.

DESCRIPTION OF THE INVENTION

This radar system makes it possible to collect stereo imagery in a single pass by utilizing an orbiting, side looking, synthetic aperture radar (SAR). In a SAR system, a pulse of coherent electromagnetic signals is transmitted to the surface of the planet where it is reflected therefrom. The reflected pulse is then received and recorded after it has been summed with a coherent reference frequency identical to the original transmitted pulse. The recorded data is a hologram which must be correlated in order to view the image properly. Correlation may be done either optically or digitally.

To produce a ground imaging radar system in accordance with the present invention, a synthetic aperture radar, having at least a transmitter and two receivers, is placed in orbit about a planet. This may be accomplished by placing a transmitter in a spacecraft and at least one of the receivers in a different spacecraft. The separation between spacecrafts is constant while transmitting and receiving signals. One way in which the separation is held constant is to provide a gravity stabilized system in which one spacecraft is located below the other and attached to one another by a tether or cable. Each spacecraft travels along a flight path which is to the same side of the area to be imaged. The flight paths do not cross over the area to be imaged but are to one side. This produces a single side looking radar system.

The separation between the spacecrafts is determined by the amount of vertical exaggeration desired in the stereo imagery. If the difference in the vertical angles between the spacecrafts and the imaged surface is increased, the vertical exaggeration and separation will also increase, causing both the length of the tether and the force on the tether to increase. Thus, the stored volume and mass of the tether increases because both the length and diameter (for a given tether material) increases. This could be a limiting factor in some cases. In the gravity stabilized configuration the separation could also be limited by the lower spacecraft entering the planet's upper atmosphere sufficiently to drag it away from its desired vertical displacement relative to the upper spacecraft.

In the deployed condition the tether does not have to be flexible because the stabilizing gravity force will keep it in tension and therefore hold it straight. It needs to be flexible however to minimize its stored volume. The center core diameter of the storage drum is wasted space and can be kept to a minimum if the tether is flexible enough to be wound on a small diameter drum. The tether also needs to have a high strength to weight ratio to minimize its diameter for a given required strength and thereby minimize its stored volume and mass. It further needs to be electrically nonconductive because long conductive wires traveling through a planet's magnetic field could induce electrical currents which generate very large electrical potentials at both ends of the cable. A multi-stranded cable may be required to achieve mission reliability requirements. These required material properties (high strength to weight ratio, flexibility, nonconductive) are currently best met by materials such as an aromatic polyamide, for example, known under The Goodyear Tire & Rubber Company tradename Flexten ™.

The transmitter transmits a pulse of coherent radar signals, perpendicular to the flight path to illuminate the area to be imaged. The signals are reflected from the imaged area and are received by the receivers along two different receiving angles. The received data may be transmitted to one of the satellites for processing and recording. This may be accomplished through the use of data links or by utilizing the tether in either an external field (G-line) capacity or as an internal field (waveguided-fiber optic) capacity using repeaters as required. Recovery of the information from this system could be made by either data linking to another satellite or to a ground station. Differences in the motion compensation could be sensed and relayed to the lower satellite for attitude and motion correcting thrusters. The corrections should not be large since the force on the lower satellite is towards the planet and thus the motions varying from the straight down position result only from external excitation such as micrometeorite impacts, solar wind pressure, etc.

The differences in the motion can be determined by comparing the average offset frequency of the data collected from the last-in (maximum range) data with the average offset frequency of the first-in (minimum range) data. If there are no rotational or displacement errors, the average offset frequencies will be correct and the same at both ranges. If the average offset frequency is higher than the correct value, then the spacecraft has rotated, pointing the antenna ahead of the desired angle (perpendicular to the orbital path), or the spacecraft is translating perpendicular to the orbital path toward the imaged area. If the average offset frequency is lower, then the antenna has rotated aft or is translating away from the imaged area. Since the average offset frequency, amplitude and direction errors and the ratio of near to far range errors are different for rotational displacements than for translational displacements, a given measured error, amplitude, direction and ratio represents a unique combination of rotational and translational displacements. This combination is calculated, and the proper correctional thruster times and durations are implemented to return the spacecraft to the proper attitude and position.

Figures 1, 2:
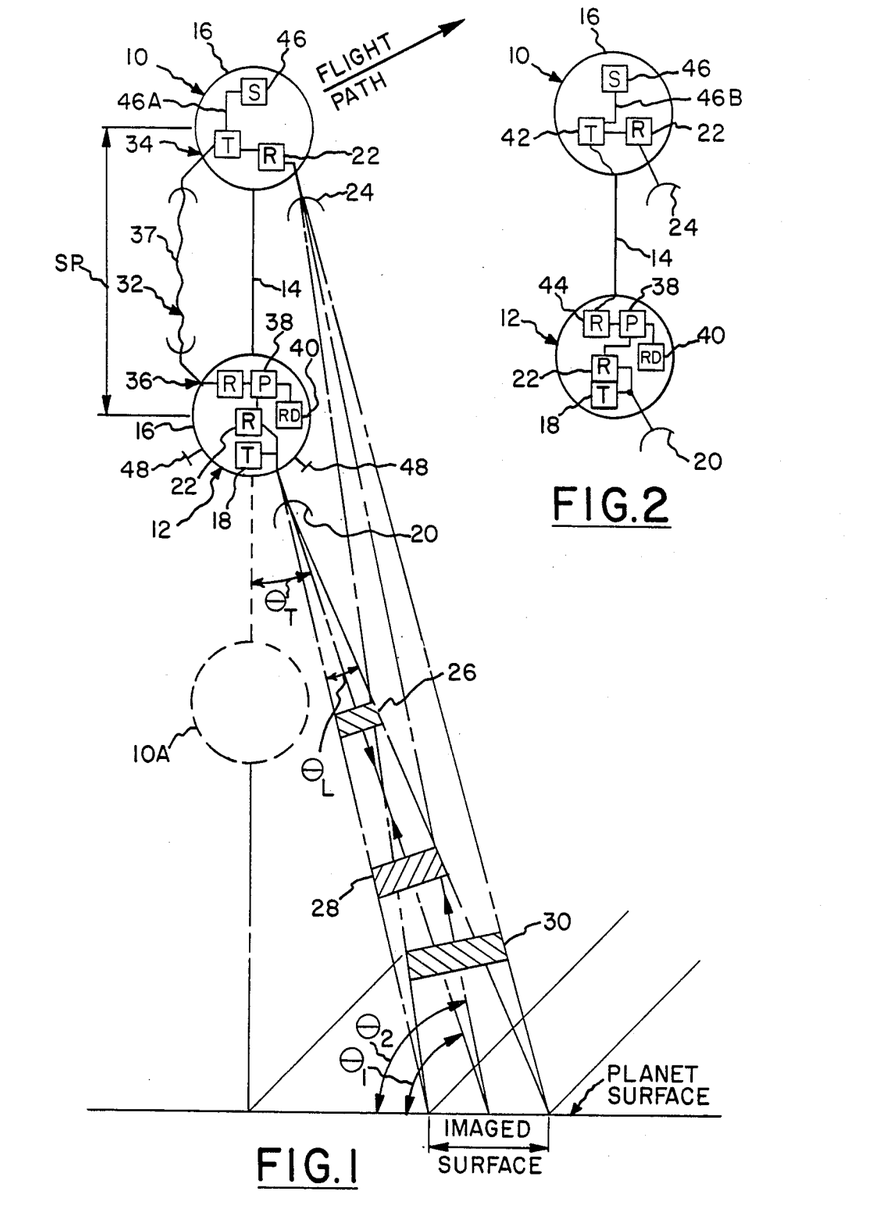
FIG. 1 is a schematic of an orbiting, stereo, side looking, synthetic aperture radar system utilizing two spacecrafts.
FIG. 2 is a schematic method of transferring signals from one satellite to another.

Now referring to FIG. 1, there is illustrated a radar system utilizing two satellites, as indicated by reference numerals 10 and 12. The satellites may be of equal or different masses, however, it is preferred that the satellite located closer to the planet's surface contain the transmitter. The separation SP between the satellites 10 and 12 is maintained through the use of a tether 14 attached to each satellite. The lower satellite 12 includes a housing 16, a transmitter 18 and receiver 22 and a transmitting and receiving antenna 20. The upper satellite 10 includes a housing 16, a receiver 22 and a receiving antenna 24. It is believed that by locating the transmitter below at least one of the receivers, the stereo image degradation due to radar shadows will be reduced and thereby provide improved stereo image quality. This results from having the shadows the same in both sets of received data. However, satellite 10 could be located below satellite 12 as shown in phantom at 10A.

Both satellites 10 and 12 are located along a flight path which is to the same side of the imaged surface. The transmitter 18 transmits a pulse 26 of coherent electromagnetic energy through antenna 20 to the imaged surface. The pulse is transmitted perpendicular to the flight path and along a transmission angle $\theta_T$. This pulse travels from the antenna to the imaged surface in the confines of an illumination angle $\theta_L$, either as a fan beam or a pencil beam.

The transmitted pulse 26 illuminates the imaged surface wherein it is scattered and reflected therefrom by ground objects. Some of the pulse is reflected 28 along an angle $\theta_1$ back towards the antenna 20 while some of the pulse is also reflected 30 along another angle $\theta_2$ towards antenna 24 and the other receiver 22. The reflected pulses 28 and 30 are received by antennas 20 and 24 respectively. The receiver 22 of satellite 12 receives the data from antenna 20 while the receiver 22 of satellite 10 receives the data from antenna 24.

The data received at each receiver may be processed and recorded separately or together. Preferably the received data is processed and recorded at one location. This may be accomplished by utilizing a data link shown generally by numeral 32. The data link 32 includes a transmitter and antenna 34 and a receiver and antenna 36. The data received by receiver 22 is electrically transmitted to the data link transmitter and antenna 34 where they are transmitted to the data link receiver and antenna 36 as shown by line 37. The data received via the data link 32 and by the receiver 22 of satellite 12 is electrically transmitted to a processor 38 for processing and then to a recorder 40. The processed data may be sent to the earth or another satellite through another data link, not shown. Alternately, as shown in FIG. 2, the data from the receiver 22 is electrically sent to a transmitter 42 which is coupled with the tether 14 such that a wave guided optical signal is sent through the tether where it is received by a receiver 44 and converted back into an electrical signal which is sent to the data processor 38.

A motion sensing means 46 may be carried by one of the spacecrafts as shown in FIG. 1. The sensor 46 could be used to determine the plane of oscillation of the other satellite and control small impulse thrusters 48 to keep such movement within acceptable limits. The signals from the sensor 46 to the impulse thrusters could be transmitted via the data link 32 through line 46A of FIG. 1 or the tether 14 through line 46B of FIG. 2.

Figure 3:
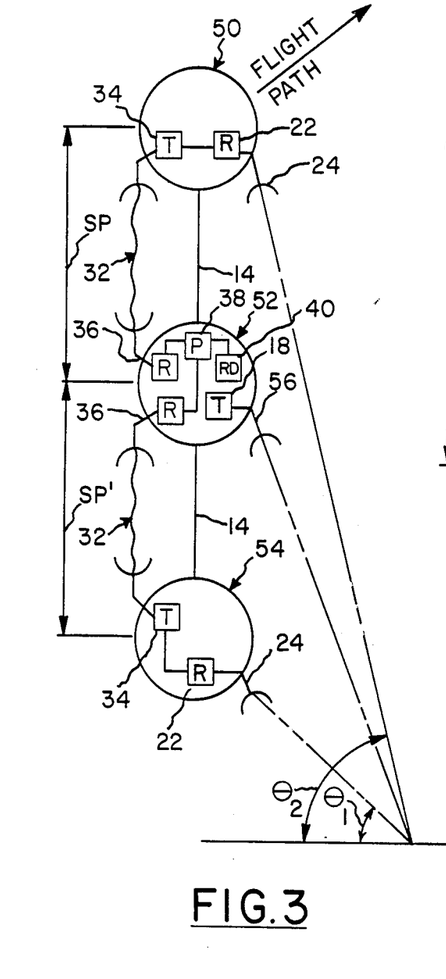
FIG. 3 is a schematic of an orbiting, stereo, side looking, synthetic aperture radar system utilizing three spacecrafts.

Now referring to FIG. 3, there is shown another embodiment of this invention utilizing three satellites as indicated by reference numerals 50, 52 and 54. In this embodiment it is preferred that the middle satellite 52 contain as much of the total mass as possible and that the upper 50 and lower 54 satellites be of equal mass. If so arranged the middle 52 satellite will be the center of gravity of the radar system. The separation SP and SP' is maintained through the use of two tethers 14, one attached between satellites 50 and 52 and the other between satellites 52 and 54. In this embodiment one satellite carries a transmitter 18 and a transmit only antenna 56 while the other satellites each carry a receiver 22 and a receive only antenna 24. The transmitter 18 may be located in any one of the satellites with the receivers in the other two but by placing the transmitter 18 in the middle satellite 52 the difference between the viewing angles $\theta_2 - \theta_1$ is greatest and thereby possibly providing the greatest resolution. Transmitting via the data link 32, including transmitter and antenna 34 and receiver and antenna 36, between satellites or communication utilizing the tether as described above could be used to transfer the received data to a processor 38 and recorder 40 and/or to provide motion compensation between satellites.

A modification to this embodiment may be to utilize one receiver in each satellite. The addition of a third receiver, not shown, along with an additional radar receive antenna or the substitution of a transmit/receive antenna for the transmit only antenna 56 of the middle satellite 52, provides for valuable redundancy for a small incremental cost. If sufficient recording or ground data link capacity is available all three received sets of data can be recorded and/or transmitted, if not, then this third set of data could be substituted if for any reason the data from any one of the other receivers is not available. This could result from the loss of a radar receiver, radar receive antenna, inter-satellite data link or even the loss of a complete upper or lower satellite.

If either upper or lower satellite is lost due to the failure of a tether the system could still provide complete stereo data by maneuvering the remaining two satellites into a stable circular orbit with the center of gravity between them. This could be accomplished by the maneuvering thrusters. If redirectable antennas are used they should be redirected to regain the original ground swath coverage, this will result only in a reduction of the stereo vertical exaggeration, resulting from the decrease of the vertical angular difference. If the antennas cannot be redirected then the remaining satellites should be maneuvered to regain the original orbital altitude of the remaining satellite pair. This can be accomplished by increasing or decreasing the orbital velocity of the satellite pair.

Figure 4:
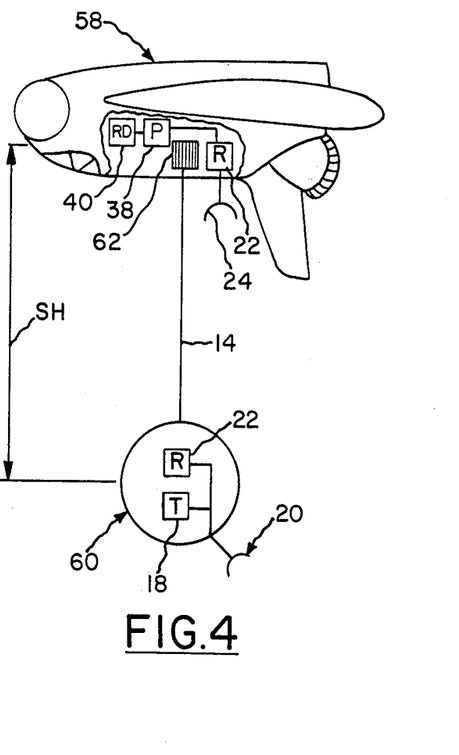
FIG. 4 is a schematic of a radar system utilizing a manned spacecraft and an unmanned spacecraft.

FIG. 4 illustrates an embodiment of this invention utilizing a manned spacecraft such as the NASA space shuttle, indicated generally by reference numeral 58, and an auxiliary satellite 60. The space shuttle 58 could house the receiver 22 and the receiver only antenna 24 while the auxiliary satellite 60 could house the transmitter 18, the receiver 22 and the transmitter/receiver antenna 20. The received data could be transmitted back to the space shuttle 58 as described above or recorded separately. The shuttle 58 houses a winch or drum 62 in which the tether 14 could be stowed on and used to deploy the satellite 60 while in orbit and to retract it back in prior to re-entry. Using this arrangement, the vertical separation SH between the receiver 22 housed within the shuttle 58 in a circular orbit one hundred fifty (150) miles above the earth and the receiver 22 housed within the satellite 60 could be fifty (50) miles below the shuttle, which would give a vertical exaggeration of 2.0 which is considered nearly ideal for stereo viewing. This vertical exaggeration would be achieved if the center of the imaged area is sixty-five (65) miles away from the nadir (directly below the shuttle). If the imaged area is further from the nadir, the vertical exaggeration will be less, and if closer, the vertical exaggeration will be greater. For this orbital configuration, $\theta_1$ will be approximately 57 degrees and $\theta_2$ will be approximately 67 degrees. These are sufficiently steep illumination angles that for convenience the transmitter might be retained in the shuttle with acceptable degradation of the stereo imagery due to shadowing. For example, the ease of deploying a tethered satellite downward from the bay (as opposed to upward around the wings or through the heat shielded "bottom" of the spacecraft), and the desire to keep the mass of the transmitter in the already massive spacecraft, may override the small shadowing preference for illuminating from the lower spacecraft. Using this separation SH and a 1,000 pound satellite 60, the tether or cable 14 could be stowed on the drum 62 which is only approximately 24 inches long and 24 inches in diameter by using currently available materials such as Flexten TM. The tether should include quadruple redundancy of four strands, any of which could carry the entire load while also employing derating safety factors.

The manned spacecraft 58 could also be used in conjunction with the radar systems as shown in FIGS. 1 or 3. The radar system of FIG. 1 could be utilized with the shuttle 58 such that the two satellites 10 and 12 are lowered using the drum 62. In like manner, satellites 50, 52 and 54 of FIG. 3 could also be deployed. In each case the shuttle could house the processor 38 and recording means 40 as could one of the satellites.

Figure 5:
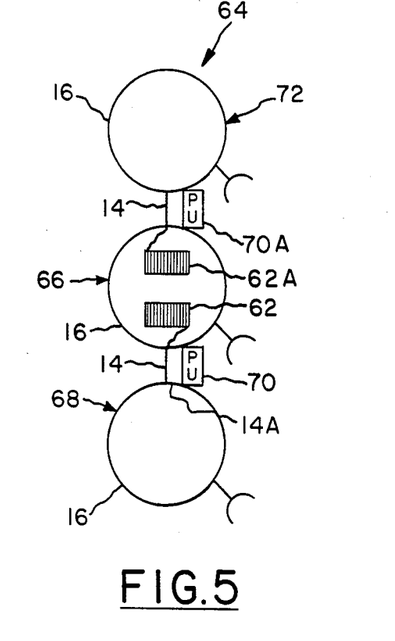
FIG. 5 is a schematic of an apparatus for providing a gravity stabilized stereo radar.

Now referring to FIG. 5 there is illustrated a gravity stabilized apparatus for providing stereo imaging per the embodiments of FIGS. 1 or 3 as indicated by reference numeral 64. The apparatus 64 has a deployment means which includes a winch or drum 62 mounted within a housing 16 of one of the spacecrafts 66. The tether 14 is attached to the drum at one end and to the housing 16 of satellite 68 at the other end 14a. The drum or winch 62 may be driven by a motor and used for running out the tether 14 to provide the required separation between housings. The drum 62 may also be used to retract the tether, and therefore, change the separation distance as required. The deployment means may also require a propulsion unit 70 in order to provide the initial force to set the satellites in motion. The propulsion unit may be a coiled spring or small thrusters. The rate at which the tether is run out is determined in conjunction with initial force provided by the propulsion unit 70. In like manner, a third spacecraft 72, if required, could be deployed from spacecraft 66 by employing another drum 62A within spacecraft 66 along with another propulsion unit 70A.

Figure 6:
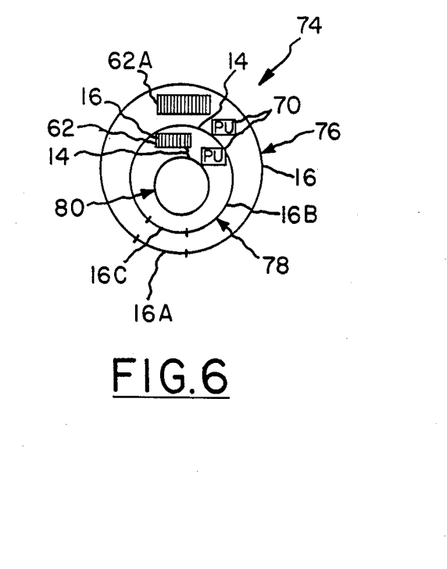
FIG. 6 is another schematic of an apparatus for providing a gravity stabilized stereo radar.

Now referring to FIG. 6 there is illustrated another apparatus for providing a gravity stabilized stereo imaging radar as indicated by reference numeral 74. The first spacecraft 76 has a housing 16 having an opening which is formed by a movable portion 16A. The spacecraft 76 carries within it another spacecraft 78 which may also have a housing 16B having an opening formed by a movable portion of the housing 16C if it carries another spacecraft 80. By opening the movable portion 16a, the satellite 78 may be lowered by the deployment means which includes the drum 62, tether 14, and the propulsion unit 70. If spacecraft 78 carries within it the spacecraft 80, then it too will carry a drum 62 and tether 14 along with the propulsion unit 70.

These descriptions and details have been shown for the purposes of illustrating this invention and it will become apparent to those skilled in the art that various changes and/or modifications may be made therein without departing from the original spirit or scope of the invention.

I claim:

1. An orbiting, stereo, side looking, synthetic aperture radar system for imaging a surface area of a planet comprising:
   a plurality of spacecrafts, spatially separated by a predetermined distance, in synchronous parallel orbits with each other, and passing along a flight path to one side of said area;
   a transmitting means carried by one spacecraft for transmitting a pulse of coherent radar signals to illuminate and reflect off of said surface, and oriented such that said signals are transmitted perpendicular to said flight path and along a predetermined vertical angle relative to said imaged surface;
   two receiving means, each carried by a different spacecraft, for each receiving a set of data corresponding to said reflected signals, including amplitude and phase information, collected from different vertical angles relative to the imaged surface; and
   wherein said transmitting means is interlocked with said receiving means such that subsequent pulse signals are isolated from the previous reflected signals.

2. The radar system as set forth in claim 1 wherein each said spacecraft is positioned at a different distance above said planet surface.

3. The radar system as set forth in claim 2 further comprising:
a tether operatively connected between each said spacecraft for maintaining said separation there between; and wherein at least one spacecraft is located substantially directly below and closer to the planet surface than the other.

4. The radar system as set forth in claim 3 further comprised by:
a deployment means carried by at least one spacecraft for operatively deploying said tether and at least one other spacecraft into orbit.

5. The radar system as set forth in claim 4 further comprised by said spacecrafts and said planet each having a center of gravity and wherein said spacecrafts and said planet are in substantial linear alignment with each other through their respective said centers of gravity.

6. The radar system as set forth in claim 5 further comprised by a processing means carried by one said spacecraft, operatively receiving and processing both sets of said data, wherein the differences in the layover of said sets provides vertical height information and stereo imagery; and
a recording means for recording said processed data.

7. The radar system as set forth in claim 6 further comprising:
a primary data link transmitting means carried by one said spacecraft, electrically coupled with said processing means for transmitting processed data to a remote receiving station.

8. The radar system as set forth in claim 7 further comprising a sensor means carried by at least one said spacecraft for sensing the difference in the motion and attitude of said spacecraft from another said spacecraft; and
attitude and motion correcting means carried by at least one said spacecraft, operatively receiving and responding to signals from said sensor means for providing attitude and motion compensation to said spacecraft.

9. The radar system as set forth in claim 8 further comprising:
a secondary data link transmitting means carried by one said spacecraft for transmitting said received data to said other spacecraft; and
a data link receiving means carried by said other spacecraft and electrically coupled with said processing means for receiving and inputting said transmitted data from said secondary data link transmitting means to said data processing means.

10. The radar system as set forth in claim 8 further comprising:
a secondary transmitting means carried by at least one spacecraft and operatively connected to said tether means for transmitting said received data to another said spacecraft via said tether means; and
a receiving means carried by said other spacecraft and coupled with said processing means for receiving and inputting said transmitted data to said data processing means.

11. The radar system as set forth in claim 5 further comprised by a recording means carried by at least one said spacecraft, for recording said data.

12. The radar system as set forth in claim 11 further comprising:
a secondary data transmitting means carried by one said spacecraft for transmitting said received data to said other spacecraft; and
a secondary data receiving means carried by said other spacecraft and electrically coupled with said recording means for receiving and inputting said transmitted data from said secondary data link transmitting means to said recording means.

13. The radar system as set forth in claim 12 further comprising a sensor means carried by at least one said spacecraft for sensing the difference in the motion and attitude of said spacecraft from another said spacecraft; and
attitude and motion correcting means carried by at least one said spacecraft, operatively receiving and responding to signals from said sensor means for providing attitude and motion compensation to said spacecraft.

14. The radar system as set forth in claim 13 further comprising:
a primary data link transmitting means carried by one said spacecraft, electrically coupled with said recording means for transmitting said recorded data to a remote receiving station.

15. A method of providing stereo imaging of a surface area of a planet comprising the steps of:
(a) deploying a first spacecraft in orbit about such planet, said spacecraft carrying at least one other spacecraft and said orbit having a flight path to one side of said area to be imaged;
(b) deploying such carried spacecraft into a gravity stabilized orbiting assembly wherein said spacecrafts are in substantial linear alignment and spatially separated by a predetermined distance with one another, having at least one spacecraft located substantially below and closer to the planet than the other and wherein said separation is maintained by a tether operatively connected between said spacecraft;
(c) passing said assembly along said flight path;
(d) transmitting from one spacecraft a pulse of coherent radar signals perpendicularly to said flight path and along a predetermined vertical angle relative to said imaged surface, to illuminate and reflect off of said surface;
(e) one spacecraft receiving a first set of data corresponding to said reflected signals received along a first predetermined receiving angle, including amplitude and phase information; and
(f) another spacecraft receiving a second set of data including amplitude and phase information, corresponding to said reflected signals received along a second predetermined receiving angle.

16. The method of claim 15 further comprising the step of:
(g) processing said first and second sets of data by correlation, including summing them with a coherent reference frequency wherein the differences in the layover of said sets provides vertical height information and stereo imagery.

17. The method of claim 16 further comprising the step of:
(h) transmitting at least one set of received data to a data processor for processing.

18. The method of claim 17 further comprising the steps of:

(i) recording said correlated data;
(j) transmitting via a data link from one such spacecraft to a remote receiving station; and
(k) compensating for differences in motion and attitude of such spacecrafts from one another.

19. A method of providing stereo imaging of a surface area of a planet comprising the steps of:
(a) deploying a plurality of spacecraft into a gravity stabilized orbiting assembly wherein said spacecrafts are in substantial linear alignment and spatially separated by a predetermined distance with one another, having at least one spacecraft located substantially below and closer to the planet than the other and said orbit having a flight path to one side of said area to be imaged;
(b) passing said assembly along said flight path;
(c) transmitting from one spacecraft a pulse of coherent radar signals perpendicularly to said flight path and along a predetermined vertical angle relative to illuminate and reflect off of said surface area;
(d) one spacecraft receiving a first set of data corresponding to said reflected signals received along a first predetermined receiving angle, including amplitude and phase information; and
(e) another spacecraft receiving a second set of data including amplitude and phase information, corresponding to said reflected signals received along a second predetermined receiving angle.

20. The method of claim 19 further comprising the step of:
(f) processing said first and second sets of data by correlation, including summing them with a coherent reference frequency wherein the differences in the layover of said sets provides vertical height information and stereo imagery;
(g) recording said correlated data; and
(h) transmitting via a data link from one such spacecraft to a remote receiving station.

21. A gravity stabilized apparatus for providing stereo imaging of a surface area of a planet comprising:
a plurality of housings capable of orbiting the surface of a planet;
a tether operatively connected between such housings adapted to provide a predetermined spacing between such housings;
a transmitting means carried by one housing for transmitting a pulse of coherent radar signals to illuminate and reflect off of such surface;
two receiving means, each carried by a different housing for receiving a set of data corresponding to said reflected signals received along different receiving angles; and
wherein said transmitting means is interlocked with said receiving means such that subsequent pulse signals are isolated from the previous reflected signals.

22. The apparatus of claim 21 further comprising:
at least one deployment means carried by at least one housing for running out or retracting said tether, providing said separation between said housings.

23. The apparatus of claim 22 further comprising:
a processing means carried by one housing for processing said sets of data, including correlating, wherein the differences in the layover of said data provides stereo imagery, including vertical height information.

24. The apparatus of claim 23 further comprising:
a recording means carried by one such housing for recording said processed data; and
a means for providing an initial force to push said housing apart.

25. The apparatus of claim 24 further comprising:
a means carried by at least one such housing for transmitting said received data to said processing means.

26. The apparatus of claim 25 further comprising:
a primary data link transmitting means carried by one such housing, electrically coupled with said processing means for transmitting processed data to a remote receiving station;
a sensor means carried by at least one such housing for sensing the difference in the motion and attitude of such housing from another such housing; and
an attitude and motion correcting means carried by at least one such housing, operatively receiving and responding to signals from said sensor means for providing attitude and motion compensation to such housings.

27. The apparatus of claim 22 wherein at least one other such housing is further comprised by:
a housing having at least one opening therein and carrying at least one additional housing;
a tether operatively connected between said housings adapted to provide a predetermined spacing there between;
at least one such separation means carried by said other housing for providing an initial thrust to said additional housing; and
at least one such deployment means carried by said other housing for running out or retracting said tether, providing said separation between said housings.

28. The apparatus of claim 22 further comprising:
a recording means carried by at least one such housing for recording said sets of data; and
a means for providing an initial force to push said housing apart.

29. The apparatus of claim 28 further comprising:
a means carried by at least one such housing for transmitting said received data to said recording means.

30. The apparatus of claim 29 further comprising:
a primary data transmitting means carried by one such housing, electrically coupled with said recording means for transmitting data to a remote receiving station for processing;
a sensor means carried by at least one such housing for sensing the difference in the motion and attitude of such housing from another such housing; and
an attitude and motion correcting means carried by at least one such housing, operatively receiving and responding to signals from said sensor means for providing attitude and motion compensation to such housings.

31. A gravity stabilized apparatus for providing stereo imaging of a surface area of a planet comprising:
a first housing, having at least one opening therein and carrying at least one other housing, said housings capable of orbiting a planet's surface;
a tether operatively connected between such housings adapted to provide a predetermined spacing there between;
a transmitting means carried by one housing for transmitting a pulse of coherent radar signals to illuminate and reflect off of such surface;
two receiving means, each carried by a different housing for receiving a set of data corresponding to said reflected signals received along different receiving angles;

wherein said transmitting means is interlocked with said receiving means such that subsequent pulse signals are isolated from the previous reflected signals;

at least one separation means carried by said first housing for providing an initial thrust to such other housings, causing them to pass through said openings; and at least one deployment means carried by at least said first housing for running out or retracting said tether, and providing said separation between said housings.

32. The apparatus of claim 31 further comprising:

a processing means carried by one housing for processing said sets of data, including correlating, wherein the differences in the layover of said data provides stereo imagery, including vertical height information.

33. The apparatus of claim 32 further comprising:

a recording means carried by one such housing for recording said processed data.

34. The apparatus of claim 33 further comprising:

a means carried by at least one such housing for transmitting said received data to said processing means.

35. The apparatus of claim 34 further comprising:

a primary data link transmitting means carried by one such spacecraft, electrically coupled with said processing means for transmitting processed data to a remote receiving station;

a sensor means carried by at least one such housing for sensing the difference in the motion and attitude of such housing from another such housing; and an attitude and motion correcting means carried by at least one such housing, operatively receiving and responding to signals from said sensor means for providing attitude and motion compensation to such housing.

* * * * *